(12) United States Patent
Petrie et al.

(10) Patent No.: US 6,574,244 B1
(45) Date of Patent: Jun. 3, 2003

(54) DETERMINING TIME STAMPS IN A DATA ACQUISITION SYSTEM

(75) Inventors: Robert William Petrie, Christchurch (NZ); Paul Richard Walton, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/187,582

(22) Filed: Nov. 4, 1998

(51) Int. Cl.[7] .................................................. H04J 3/06

(52) U.S. Cl. .................... 370/503; 370/520; 370/524

(58) Field of Search ................................ 370/503, 394, 370/473, 474, 517, 520, 324, 514; 713/178, 503, 400; 375/354, 371, 365, 366

(56) References Cited

U.S. PATENT DOCUMENTS 5,790,605 A * 8/1998 Helm et al. ................. 375/347
6,327,274 B1 * 12/2001 Ravikanth ................... 370/516

* cited by examiner

Primary Examiner—Seema S. Rao
Assistant Examiner—Melanie Jagannathan
(74) Attorney, Agent, or Firm—Blakely Sokoloff Taylor & Zafman LLP

(57) ABSTRACT

Streams of data packets and timing pulses are received from a source. Time stamping of the data packets is carried out largely independent of individual timing pulses. A normalised pulse time of arrival is calculated, preferably as a running average over the most recent arrivals. Times of applicability for the content of the packets can then be calculated according to a predetermined relationship between the order of arrival and of corresponding pulses and packets. Data acquisition may take place from an external or internal data source. An example external source is a GPS receiver.

9 Claims, 4 Drawing Sheets

DETERMINING TIME STAMPS IN A DATA ACQUISITION SYSTEM

FIELD OF THE INVENTION

This invention relates to time stamping of data packets output by a data source to a data acquisition system, and particularly but not solely to stamping of data packets output by a GPS receiver, such as UTC time or position measurements. Timing pulses output by the source are used to calculate a time of applicability for the information content of each packet.

BACKGROUND TO THE INVENTION

Data acquisition typically involves production of data by one or more sources followed by various stages of processing, storage and use of the data. A source may be a specialized item of equipment which transmits a stream of data packets and associated timing signals for initial processing by an equipment handler which forms part of a separate computer system. One example of this arrangement is a navigational system in which one or more GPS (Global Positioning System) antenna/receivers produce time or position data for use by an onboard navigation system. A stream of relatively crude data is transmitted by each antenna/receiver over a cable connection for processing by a software package running on a central computer. Other arrangements may involve systems in which data originates from a software device or driver and is transmitted to another software device by way of inter-process communication channels, procedure calls or software queues.

Various methods are used by data acquisition system to calculate and stamp a time of applicability on packets in an incoming data stream. Once stamped the packed are passed on for further processing as required in the particular system. Methods involved constant latency determine a time of arrival for each packet in the system and simply subtract a fixed delay relating to the lapse of time between measurement of the data and the time arrival. More complex latency calculations involve variation of the delay according to the data itself, to account for water depth and speed of sound for example. In GPS related systems each data packet may already contain a GPS or UTC (Universal Time Coordinated) time stamp which may be converted to a local system time stamp, provided the difference between the two timeframes is known. The acquisition system will typically use GPS or UTC time inputs from a GPS receiver to calculate a running average time difference between the two timeframes, that is the GPS and UTC time from the receiver and the timeframe of the acquisition system. Data time of applicability can be calculated by subtracting an offset from each GPS or UTC time stamp.

Hardware timing is another common method for determining time of applicability. The stream of data packets is accompanied by a stream of timing pulses which are also output by the data source. Each packet transmitted from the source is assumed to be associated with a timing pulse which is expected to arrive before, after or during receipt of the packet according to a predetermined relationship. The time of applicability for the data in the packet is based on the time of arrival in the system of the corresponding pulse. One problem with a simple timing arrangement of this kind is that either a pulse or a packet may be missed, throwing the system out of synchronization. Various algorithms have been devised to solve the problem and reduce timing errors. For example, where a packet is received without a corresponding pulse, a time-out period may be permitted after which the packet is sent on with a time stamp based on the data packet time of arrival. Another solution involves statistical prediction of pulse arrival times and generation of proxy pulses.

A specific example of hardware timing occurs in the output of some GPS receivers. Trimble™ 7400 receivers can produce ASCII time tag packets containing UTC data, at a rate of 1 Hz on a serial port. 1 PPS timing strobe can be output on an auxiliary port with the leading edge of each pulse coinciding with the beginning of UTC second. Time tags are output by about 0.5 s before their corresponding pulses. The receivers can also produce position packets near the beginning of each UTC second. However, experience has shown that pulses can be omitted from the timing stream for various reasons, and when the data stream is saturated relative to the serial port rate, the time tags can occasionally by missed as well.

SUMMARY OF THE INVENTION

It is therefore an object of the present invention to provide an improved or at least alternative method for time stamping in data acquisition systems which make use of hardware timing arrangements. The method has improved reliability in circumstances where pulses or packets are omitted from their respective timing or data streams.

Accordingly the invention may broadly be said to consist in a method of determining time stamps wherein the data acquisition system carries out an ongoing calculation of a "normalized" time of arrival for the timing pulses. A time of applicability for each data packet is then calculated from the normalized time of arrival without necessarily attributing any particular pulse to a particular data packet. In a preferred embodiment the normalization calculation involves averaging over a buffer of stored pulse times of arrival.

In one aspect the invention may also be said to consist in a method of determining time stamps for data packets arriving in a data acquisition system comprising: receiving a stream of timing pulses from a data source, determining a time of arrival for each received pulse, calculating a running normalized time of arrival for the pulses, receiving a stream of data packets from the data source, determining a time of arrival for each received data packet, and calculating a time stamp for each packet according to the time of arrival of the packet, the normalized time of arrival for the pulses, and a predetermined relationship between the packets and pulses.

In another aspect the invention may also be said to consist in a data acquisition apparatus comprising: a pulse time processing system for a receiving a stream of timing pulses from the source, a packet time processing system for receiving a stream of data packets from the source, wherein the pulse time processing system continually calculates a normalized pulse time of arrival as the pulses are received, and the packet time processing system calculates a time stamp for each received packet according to the normalized pulse time of arrival and a predetermined relationship between the packets and pulses.

Other aspects of the invention will become evident from the following description and drawings.

BRIEF DESCRIPTION OF THE DRAWINGS

A preferred embodiment of the invention will be described with reference to the accompanying drawings, in which.

DETAILED DESCRIPTION

Figure 1:
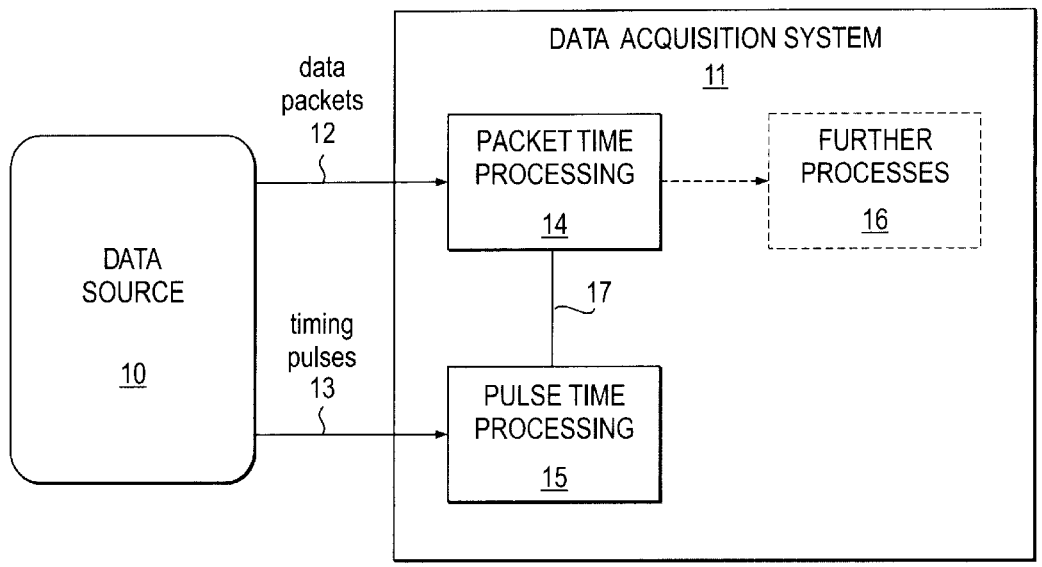
FIG. 1 schematically shows a data source and data acquisition system.

Referring to the drawings it will be appreciated that the invention may take many forms in a wide variety of data acquisition systems. A preferred embodiment is described by way of example only, within the scope of the claims which follow. A detailed discussion of data acquisition and hardware timing techniques will not be necessary for the skilled reader and has not been provided.

FIG. 1 shows a data acquisition arrangement in schematic form. A data source 10 is shown separate from an acquisition system 11 although both devices could be combined in a single item of equipment. The source produces a stream of data packets 12 and a stream of timing pulses 13 on a connection between the devices. These streams or "services" are processed separately in the acquisition system by respective packet and pulse time-processing modules 14 and 15. The modules are typically software systems which are in turn part of a larger processing package. Once processed by module 14 the data packets are passed on elsewhere inside or outside the acquisition system for further processing, storage or display purposes 16 as required. The pulse processing module carries out an ongoing calculation as timing pulses are received and provides a normalized pulse time of arrival as an input 17 to the packet processing module 14.

Figure 2A:
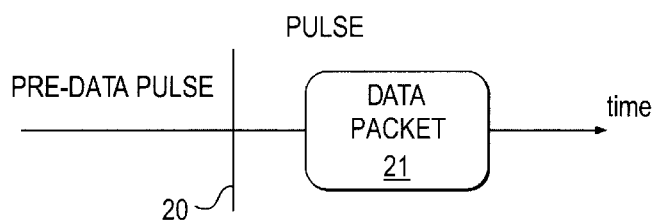
FIGS. 2a, 2b, 2c, respectively demonstrate pre-data, post-data and sync-data timing relationships.
Figure 2B:
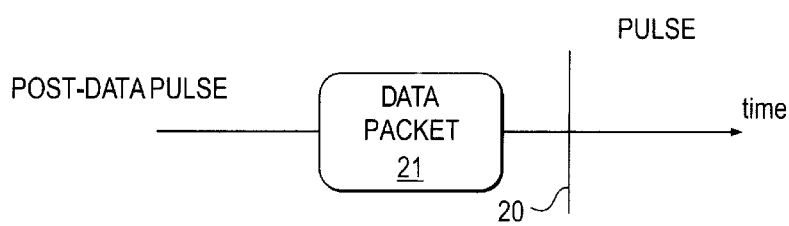
Figure 2C:
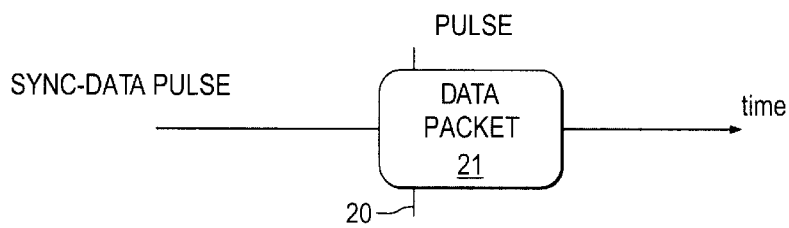

FIGS. 2a, 2b, and 2c indicate three predetermined relationships any one of which may be selected between the data packets and timing pulses in the arrangement of FIG. 1. In the pre-data and post-data pulse relationships a pulse 20 is expected to arrive respectively before or after the corresponding packet 21. In a sync-data relationship the pulse is expected to arrive approximately simultaneously with the packet. Details regarding the pulse/packet relationships form part of a software configuration item which is normally maintained by the acquisition system and selected to match that of the data source. A value PP for the pulse period being the time between consecutive pulses is another configuration item which must be selected when setting up an acquisition system. The packet processing module 14 calculates time of applicability stamps for the incoming packets in a difference manner according to the pulse/packet relationship that has been selected, as will be described below.

Figure 3:
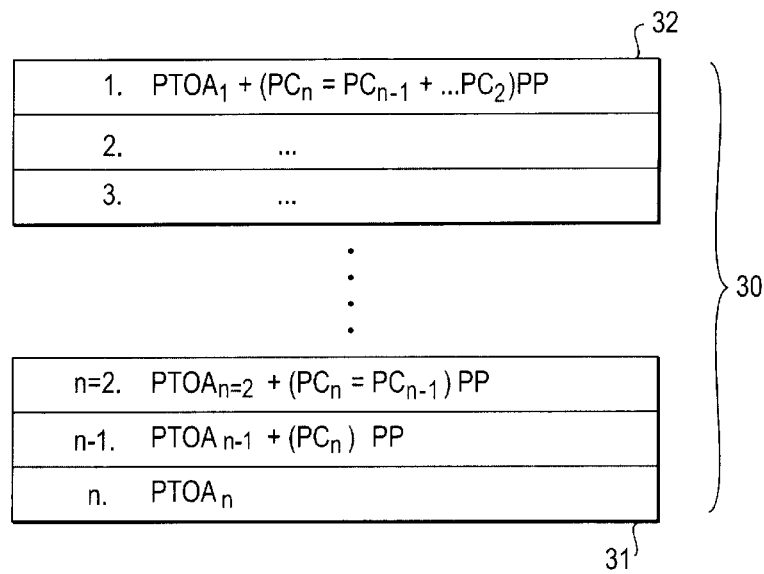
FIG. 3 schematically shows the content of a buffer in the data acquisition system.

FIG. 3 represents a buffer 30 used by the pulse processing module 15 of FIG. 1. The buffer stores a list of time values relating to a most recently received timing pulses. The buffer size is typically ten or more. A PTOA (pulse time of arrival) is determined for each newly received pulse and stored in the buffer as the last item 31 of the list, designated $PTOA_n$. Each new value is compared with the preceding value $PTOA_{n-1}$ and their difference is calculated to the nearest whole number $PC_n$ of pulse periods PP. Alternatively, each new value is compared with a calculated normalized PTOA which may be in the form of an APTOA (average pulse time of arrival) as illustrated in the flowchart in FIG. 5. This difference is added to all preceding values in the list. This process ensures that all values in the list are normalized with respect to each other. FIG. 3 illustrates the state of the buffer after the new value $PTOA_n$ has been stored as the last item and after all preceding values have been updated with the difference $PC_n$ (PP). The first item 32 in the list represents the oldest time value which is currently stored, designated $PTOA_1 + (PC_n + PC_{n-1} + \ldots + PC_2)$ PP. A normalized PTOA can then be calculated from the buffer largely independent of whether or not a pulse has been missed from the incoming stream. Preferably the normalized PTOA is an average over the stored values although various other normalization processes may be envisaged.

Figure 4A:
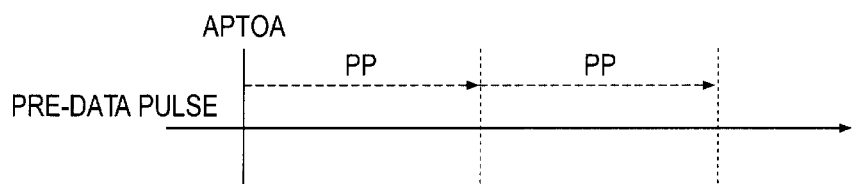
FIGS. 4a, 4b, 4c, respectively demonstrate time stamp calculations for each of the timing relationships.
Figure 4B:
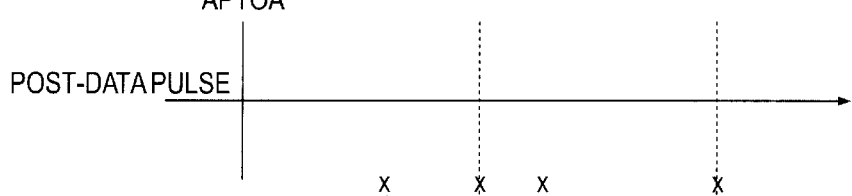
Figure 4C:
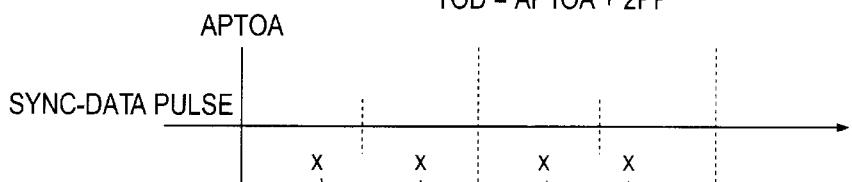

FIGS. 4a, 4b, and 4c indicate how a normalized PTOA in the form of an average APTOA can then be used for time stamping by the packet processing module 14 of FIG. 1. Each packet is given a time of applicability stamp TOD (time of data) according to the pulse/packet relationship which has been selected, and the time interval between DTOA (data time of arrival) for the packet and the most recent APTOA. Example calculations are shown for four DTOA events marked X for each of the three possible relationships. In general these calculations may be summarized by the following equations:

TOD=APTOA=m*PP where:

m=Int[(DTOA−APTOA)/PP] for pre-data pulses, FIG. 4a m=Int[(DTOA−APTOA)/PP=1] for post-data pulses, FIG. 4b m=Rnd[(DTOA−APTOA)/PP] for sync-data pulses, FIG. 4c The Integer function (Int) cuts down to an integer value, while the Round function (Rnd) rounds up or down to the nearest integer value. PP is the period between pulses.

Figure 5:
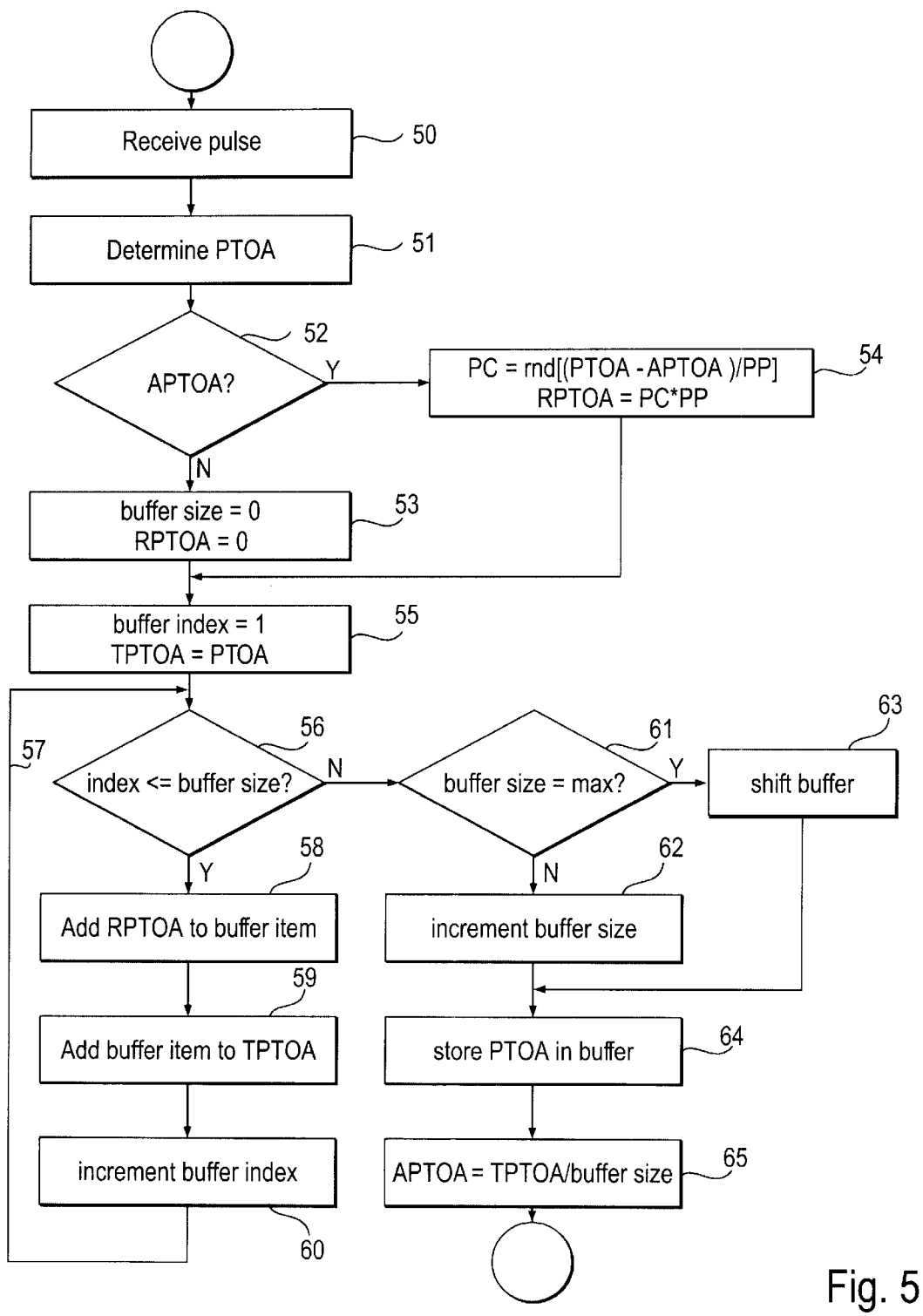
FIG. 5 is a flowchart indicating the determination of a normalized pulse time of arrival by the data acquisition system.

FIG. 5 is a flowchart which outlines how the pulse processing module 15 in FIG. 1 may calculate a normalized PTOA such as a running average APTOA over items in a buffer. The module receives a pulse in step 50 and determines a pulse time of arrival PTOA in step 51. If no APTOA has yet been calculated the module proceeds through a test 52 to initialize the buffer to zero size and zero RPTOA (relative pulse time of arrival) in step 53. Otherwise this process normally branches to step 54 and calculates an integer number PC of pulse periods PP between PTOA and APTOA, and a RPTOA. In step 55 the process then initializes a cycle to update the buffer with the most recently received pulse information, setting an index to the first item and an aggregate TPTOA (total pulse time of arrival) to PTOA. While the buffer size is greater than or equal to the index in test 56 the process cycles though loop 57 before finally calculating a new APTOA value.

In loop 57 the process adds RPTOA to each item in the buffer, step 58, adds the new value of that item to the aggregate TPTOA in step 59, and increments the index, step 60. Eventually the index exceeds the buffer size and the process exits the loop to determine whether the buffer is full in step 61. If the buffer is still filling the size is incremented towards a maximum value (perhaps 10) in step 62, otherwise the process must normally carry out a shift operation through step 63 to remove the oldest item. The most recent PTOA can then be stored in the buffer, step 64, and the new APTOA calculated as an average of the buffer contents in step 65. The normalized APTOA value is then passed to module 14 as indicated by connection 17 in FIG. 1.

Figure 6:
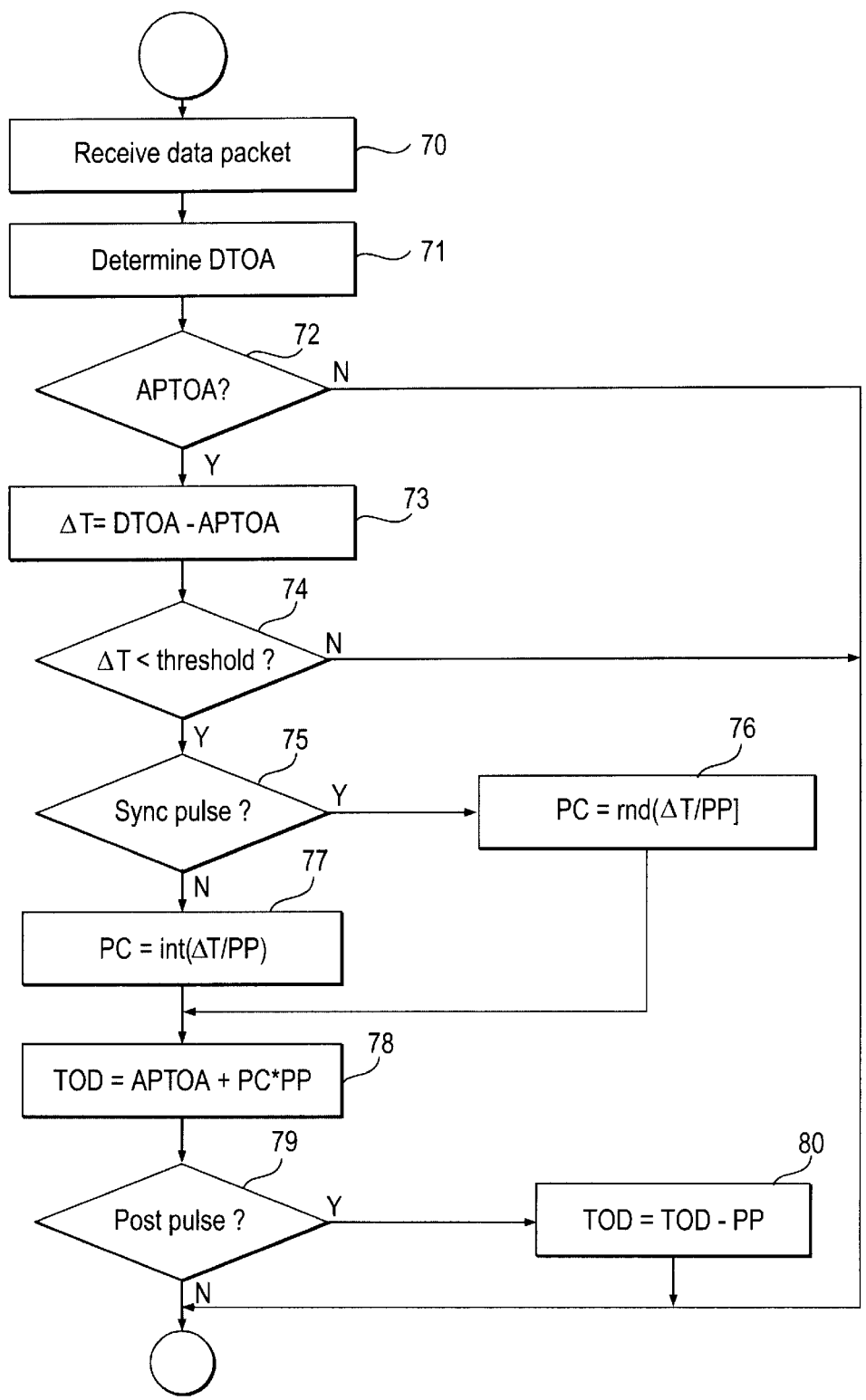
FIG. 6 is a flowchart indicating the determination of time stamps for data packets.

FIG. 6 is a flowchart which outlines how the packet processing module 14 in FIG. 1 calculated time stamps from a normalized PTOA. The module receives a data packet in step 70 and determines a data time of arrival DTOA in step 71. If no APTOA has yet been calculated the process branches to an end from test 72 and may generate an error message. Otherwise the process normally calculates a time difference T in step 73 from DTOA and APTOA. If this difference is too large (perhaps over 30s) the APTOA is too old and the process times out in test 74. Otherwise the process normally progresses to calculate a time of applicability TOD (time of data) stamp according to the existing pulse/packet relationship and the equations set out above.

Test 75 determines whether a sync-pulse mode has been configured. If so the process calculates a rounded integer number of pulse periods between DTOA and APTOA in branch 76. Otherwise a cut integer value is determined in step 77. A value of TOD can then be calculated in step 78 for either the sync-data or pre-pulse mode. In post-pulse mode an extra pulse period is added TOD through step 80 via test 79. The TOD can then be stamped on the data packet and passed on from the packet processing module.

Determination of time stamps according to the present invention has been described above by way of example only. Known equivalents of the parts or features set forth which are not explicitly stated are nevertheless deemed to be included. The invention will find uses in a range of hardware timing arrangements within the scope of the following claims.

What is claimed is:

1. A method of determining time stamps for data packets arriving in a data acquisition system comprising:

receiving a stream of timing pulses from a data source;

determining a time of arrival for each received pulse;

calculating a normalized time of arrival for the pulses;

receiving a stream of data packets from the data source;

determining a time of arrival for each received data packet; and calculating a time stamp for each received packet according to the time of arrival of the packet, the normalized time of arrival for the pulses, and a predetermined relationship between the packets and pulses.

2. A method according to claim 1 wherein the step of calculating a normalized time of arrival comprises the steps of:

storing times of arrival for a plurality of received pulses;

calculating a relative time or arrival between each received pulses;

adding each relative time of arrival to the times of arrival which have been stored for a preceding plurality of received pulses; and calculating an average over the stored time of arrivals.

3. A method according to claim 2 wherein each relative time of arrival is calculated according to the number of pulse periods between the time of arrival of the respective pulse.

4. A method according to claim 1 wherein the step of calculating a time stamp comprises the steps of adding a number of pulse periods to the normalized time of arrival for the pulses according to the timing relationship between packets and pulses.

5. A method according to claim 1 wherein the packets and pulses are selected from the group consisting of packets and pulses having a pre-data timing relationship, post-data, or sync-data timing relationship.

6. A data acquisition apparatus comprising:

a pulse time processing system configured to receive a stream of timing pulses from a source and calculate a normalized pulse time of arrival;

a packet time processing system configured to receive a stream of data packets from the source, and calculate a time stamp for each received packet according to the normalized pulse time of arrival; and a buffer coupled to the pulse time processing system and configured to store a plurality of pulse times of arrival with respective added sequences of relative pulse times of arrival for subsequently received pulses, wherein said pulsed time processing system is configured to calculate the normalized pulse time of arrival as an average of pulse times of arrival stored in the buffer.

7. The apparatus according to claim 6 wherein each relative time of arrival for a pulse is calculated according to the difference between time of arrival of the pulse and the normalized time of arrival.

8. The apparatus according to claim 6, wherein each time stamp for a data packet is calculated by adding a number of pulse periods to the normalized pulse time of arrival.

9. The apparatus according to claim 6, wherein the timing pulses and data packets arrive in a timing relationship selected from the group consisting of pre-data, post-data or sync-data timing relationships.

* * * * *